United States Patent
Buestgens et al.

(10) Patent No.: US 8,556,373 B2
(45) Date of Patent: Oct. 15, 2013

(54) MULTICHANNEL-PRINTHEAD OR DOSING HEAD

(75) Inventors: Burkhard Buestgens, Gundelfingen (DE); Suheel Roland Georges, Freiburg (DE)

(73) Assignee: Burkhard Buestgens, Gundelfingen (DE)

( * ) Notice: Subject to any disclaimer, the term of this patent is extended or adjusted under 35 U.S.C. 154(b) by 367 days.

(21) Appl. No.: 12/819,413

(22) Filed: Jun. 21, 2010

(65) Prior Publication Data

US 2010/0321448 A1   Dec. 23, 2010

Related U.S. Application Data (60) Provisional application No. 61/218,527, filed on Jun. 19, 2009.

(51) Int. Cl.
*B41J 2/015* (2006.01)
(52) U.S. Cl.
USPC .......................................................... 347/20
(58) Field of Classification Search
None
See application file for complete search history.

(56) References Cited

U.S. PATENT DOCUMENTS

| | | | |
|---|---|---|---|
| 4,723,131 A | 2/1988 | Droit | |
| 4,924,241 A | 5/1990 | Parks et al. | |
| 6,130,694 A | 10/2000 | Beatty | |
| 6,402,403 B1 | 6/2002 | Speakman | |
| 7,883,182 B2 | 2/2011 | Van Lierop et al. | |
| 2001/0038402 A1 | 11/2001 | Percin et al. | |
| 2003/0201416 A1 | 10/2003 | Miles | |
| 2004/0011883 A1 | 1/2004 | Ohnishi et al. | |
| 2004/0050974 A1 | 3/2004 | Lee et al. | |
| 2004/0209354 A1* | 10/2004 | Mathies et al. | ............ 435/287.2 |
| 2005/0219329 A1 | 10/2005 | Sanada | |
| 2008/0239025 A1 | 10/2008 | Wang | |
| 2011/0073619 A1 | 3/2011 | Kim et al. | |

FOREIGN PATENT DOCUMENTS

DE   102006006706 A1   8/2007

OTHER PUBLICATIONS

International Search Report of PCT/IB2010/002015, which is complementary to this U.S. application PCT/IB2010/002015 claims priority to DE102000029946.7-27, which is identical to the provisional application to which priority of this application is claimed.
Written Opinion on the International Searching Authority on PCT/IB2010/002015, which is complementary to this U.S. application.
Written Opinion of the German Patent Office on DE102009029946.7-27, which is identical to the provisional application to which priority of this application is claimed.

* cited by examiner

*Primary Examiner* — Matthew Luu
*Assistant Examiner* — Erica Lin (57) ABSTRACT

A Printhead, particularly suitable for viscous or particle-filled fluids, with multiple channels is proposed. A channel of the printhead is characterized by a micro-electro-pneumatic circuit 2 containing a series circuit between a first and second pressure level out of a micro-valve 18 and a pneumatic throttle 23, for generating a control pressure $p_c$ at the common pneumatic node 5 of micro-valve 18 and pneumatic throttle 23, further a drop-on-demand fluid ejector 4 with a diaphragm 8 actuated by the control pressure $p_c$, the fluid ejector 4 controlling the fluid discharge through fluid outlet 6.

10 Claims, 9 Drawing Sheets

MULTICHANNEL-PRINTHEAD OR DOSING HEAD

The invention relates to a Print- or printhead according to the preamble of claim 1, for printing, dispensing, or dispensing of liquids on surfaces or three-dimensional structures, hereinafter referred to briefly as printing. In particular, it relates to the printing with a printhead, printhead, dispenser, or other comparable devices, hereinafter referred to as printhead, with a plurality of fluid outlets 6, which are arranged in a geometrically regular pattern, preferably in rows. The invention further relates to the printing or dispensing of fluid volumes in the range of nanoliter to milliliter per shot, fluids with medium viscosity (up to 1 Pas), which also may include particles (size: up to 0.3 mm particle size) in concentrations up to 90%, with rates up to the kHz range and a pitch down to far below a millimeter. The invention relates in particular to printing with a mobile device, which should be lightweight and will work safely without leakage under accelerations.

Today's inkjet printheads are suitable with respect to the discharge frequency and work predominantly according to the fluid displacement principle. Their use is limited to fluids with a viscosity below 25 mPas. Printheads for liquids of higher viscosity working according to the fluid displacement principle can also be realized by using powerful piezo stack actuators. However, a multi-channel printhead with a pitch smaller than 4 mm, with light weight, suitable for the processing of medium viscosity fluids with a droplet rate in the kHz range can not be realized.

Valve technology-based printheads as in U.S. Pat. No. 5,119,110 or U.S. Pat. No. 5,356,034 are also suitable with respect to the frequency of operation. In contrast to printheads working according to the fluid displacement principle they have the advantage that the required high energies for the discharge of viscous fluids are provided by a pressure source. However, because of the higher fluid viscosities also higher switching energies are required for switching the fluid flow, as can be provided by known valve technology-type electromagnetic (U.S. Pat. No. 5,356,034) or piezoelectric (U.S. 2009/0115816) printheads, in order to a to meet the requirements according to the invention regarding fluid properties, pitch, droplet frequency and drop weight.

The invention solves the above inventive problem using a printhead according to claim 1.

Furthermore, the invention discloses a method of printing, dosing, or dispensing of fluids with a printhead 1 with multiple electrically addressable channels, each channel converting an electrical control signal into a pneumatic control pressure $p_c$ of greater energy by using a micro-electro-pneumatic-circuit, the control pressure actuating a diaphragm of a fluid ejector so that as a consequence of a resulting fluid displacement or a resulting release of a valve opening a fluid discharge is effected.

The invention discloses devices and methods for printing, dispensing or dosing of one- or multi-phase fluids, emulsions or dispersions, with or without solid content, with a viscosity up to the region of 1 Pas, by means of a printhead 1 with a small size and low weight, with fluid nozzle distance in the order of tenths of millimeters to millimeters, with a droplet rate up to the kHz range, with variable droplet sizes from the picoliter to the micro liter range.

The invention discloses devices and methods for printing, dispensing or dosing by means of a printhead with a plurality of channels, which contain a micro-electro-pneumatic circuit, which is used to control one or more pneumatically actuated fluid ejectors.

The invention discloses devices and methods for printing, dispensing or dosing by means of a printhead 1 with a plurality of channels, which contain a micro-electro-pneumatic circuit, containing means to convert an electrical control signal of low energy into a pneumatic control signal of higher energy.

The invention further discloses devices and methods for conversion of an electrical control signal into a pneumatic control signal, using electro-pneumatic transducers, preferably using magnetic or piezoelectric pneumatic valves, further preferably using micro-valves 18, and by using other pneumatic elements providing fluid restriction.

The invention further discloses devices and methods for printing, dispensing or dosing by means of a printhead 1 with a plurality of channels, which include a fluid ejector 4, which operates on the principle of displacement or on the valve principle.

The invention further discloses devices and methods for printing, dispensing or dosing by means of a printhead 1, which contains structures that contain features of the same kind of the ejectors of multiple channels.

The invention further discloses devices and methods for printing, dispensing or dosing by means of a printhead 1, which contains structures that contain features of the electro-pneumatic circuits of multiple channels.

The invention also discloses devices and methods for printing, dispensing or dosing by means of a printhead 1 with a diaphragm 8, which extends over one or more channels, transmitting the pneumatic energy to the corresponding ejectors, bulging and pressing onto an opening to prevent the Fluid passing through the opening or, displacing fluid, as a result emitting the fluid through one or more corresponding fluid outlets, or, displacing fluid, emitting it through an fluid outlet until the diaphragm 8 is in contact with the associated fluid outlet, closing this, and by this interrupting the fluid flow abruptly, separating the fluid already being discharged.

The invention also discloses devices and methods to quickly change a fluid-carrying part against a new or differently configured.

The invention further discloses devices and methods for integrating the control electronics as used for actuating the electro-pneumatic transducers in particular so, that the control electronics is purged by air thus discharging heat from the control electronics.

INDUSTRIAL APPLICABILITY

With the inventive printhead a variety of fluids in a variety of applications can be dosed or printed. Within the scope of this invention, fluid is called a liquid, flowing freely or under pressure, containing one or multiple phases and having a viscosity profile, which in its viscosity-shear stress-characteristic curve at least partly comprises values below 1 Pas. In particular, fluids with thixotropic or shear-thinning properties are processable. A multi-phase fluid may be a fluid with insoluble particles, fluid droplets or air bubbles embedded in the liquid. The following list is only designated to show examples of processable fluids and uses: Printing of aqueous solutions, inks, colors (printing of wall paint, latex paints, mineral paints, artist paints), varnishes, plaster (printing of plaster, stucco), liquid polymers, UV curable liquid polymers (example: Rapid Prototyping), waxes, adhesives and resins, filled or unfilled, fats, oils, in principle printing of all kinds of fluids being used within the field of printing technology, such as printing inks, and colors, partially cross-linked liquids, high-viscosity substances or bodily fluids (blood, sputum), fluids of food production, reagents or analytes from the medical, biomedical and biological fields, including liquids, which generate foams before, during or after the application. A fluid may also be understood as a gas, which can be dosed by the inventive devices and methods in high volume and high frequency.

A preferred use of the inventive printhead according to claim 1 is the use as a printhead to print particle loaded liquids, with a particle size up to the range of tenths of millimeters. Preferably the inventive printhead can be used to create a paint coating or a graphics on a wall by printing wall paint or dispersion paint, especially preferably by using a hand-held printer which requires a light weight powerful printhead. Or to print pastes (e.g. conductive, insulator or resistor pastes) in thick film technology, or slurries (glass slurries or other), or food.

Another preferred use of the inventive printhead is to produce 3-dimensional structures, e.g. for use in rapid prototyping or to print braille characters.

BRIEF DESCRIPTION OF THE DRAWINGS

Various exemplary embodiments of the devices and methods of this invention are hereinafter described in detail with reference to the accompanying drawings.

DETAILED DESCRIPTION OF THE INVENTION

Figure 1:
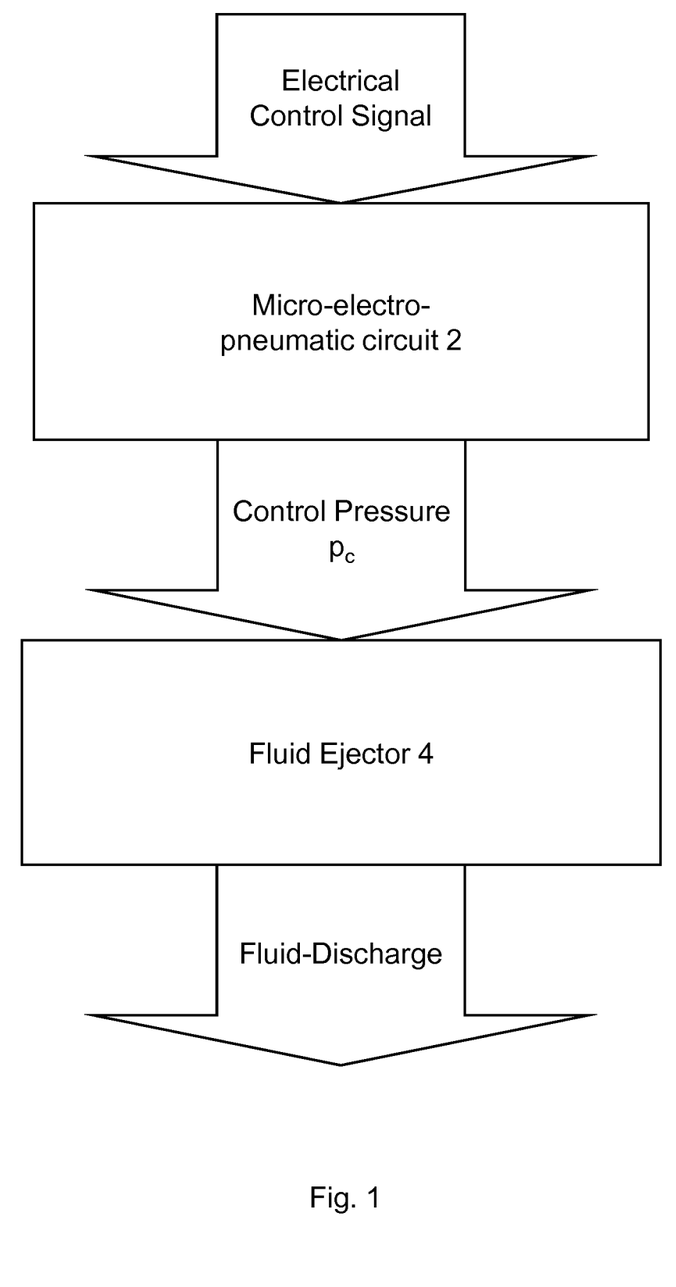
FIG. 1 shows devices and methods according to the invention for printing, dispensing or dosing by means of printhead 1.

FIG. 1 shows a block diagram of the inventive devices and methods for one channel of the printhead 1. The term printhead should be representative for printhead, printhead without to been explicitly limited to those. As printhead should generally be understood a device, used to apply fluid contactless on surfaces of any kind, continuously or intermittently, by means of regularly spaced, electronically individually controllable channels. According to nomenclature used here, a channel is the smallest addressable unit of the electronic printhead 1. A channel may still have multiple fluid outlets. A "printhead" may furthermore cover non-contact fluid applications, such as general dosing and fluid control applications, which are not associated with a direct fluid release.

Devices and methods according to the invention convert per each channel an electrical control signal of low energy by means of a micro-electro-pneumatic circuit into a pneumatic control signal $p_c$ of higher energy (FIG. 1). The additional energy comes from one or more pressure sources $p_1, p_2, \ldots$ which are referred to hereafter as pressure levels. A micro-electro-pneumatic circuit 2 is understood as a network of micro-electro-pneumatic elements. These can be, for example electro-pneumatic converters, pneumatic-mechanical transducers, pneumatic throttles, dead volumes, pipes and cavities.

The pneumatic control signal $p_c$ of each channel is used for actuation of at least one pneumatically-controlled fluid ejector. A pneumatic controlled fluid ejector 4 is understood as a device that responsive to a pneumatic control pressure applied to a diaphragm ejects fluid from one or more fluid outlets. Diaphragm shall also represent other suitable pneumatic actuators, such as a flexible plate, a membrane or plate with a suspension, a movable piston, a bellow or inflatable part, a hose or a fluid line of other cross-sectional shape (rectangular, oval . . . ).

Figure 2:
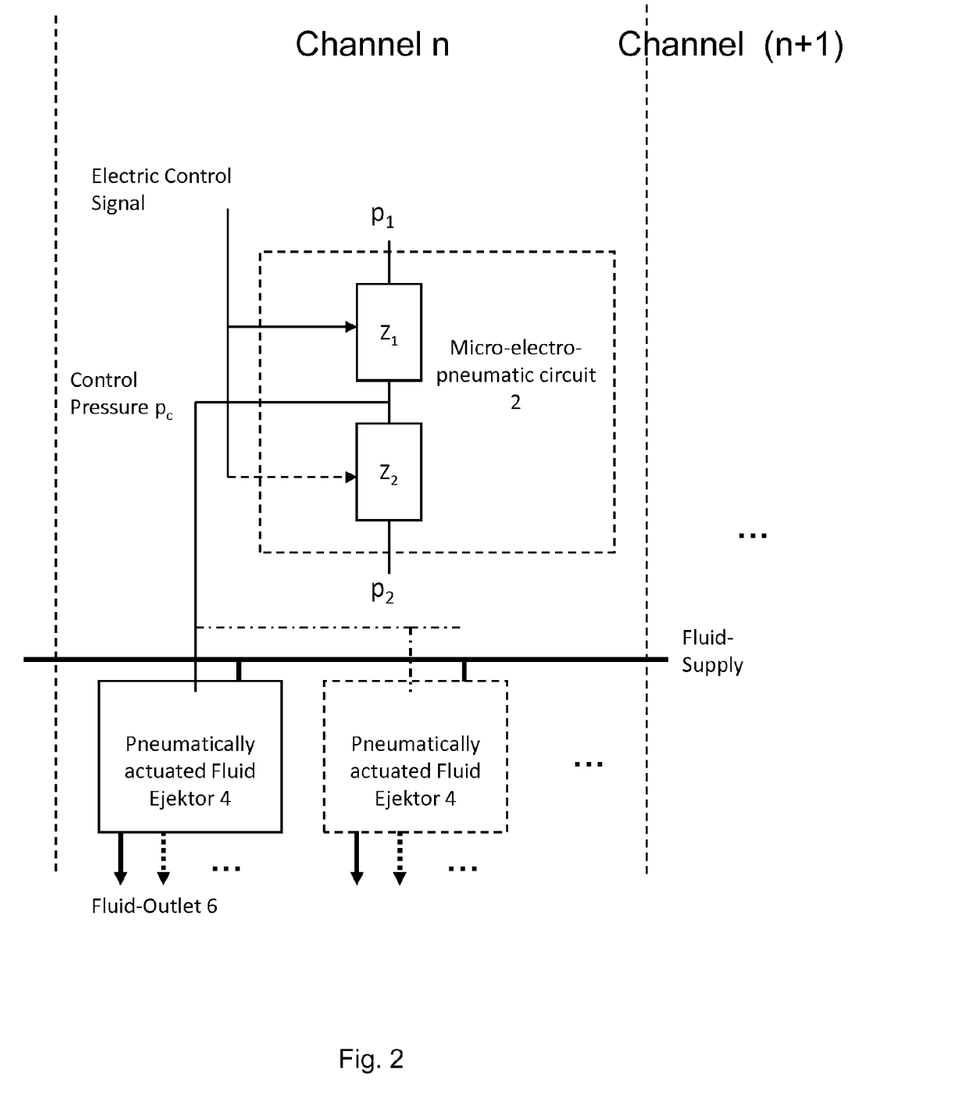
FIG. 2 shows devices and methods according to the invention for printing, dispensing or dosing by means of printhead 1 in greater detail.

FIG. 2 shows in detail the devices and procedures according to the invention with respect to the micro-electro-pneumatic circuit and a pneumatically driven fluid ejector of an electronically addressable channel n.

A micro-electro-pneumatic circuit 2 contains between a first pressure level $p_1$ and a second pressure level $p_2$ a series circuit out of a first pneumatic element, which is a microvalve 18, and a second pneumatic element, which is a throttle 23, whereby at the common pneumatic node 5 a pneumatic control signal or briefly a control pressure $p_c$ is generated which is pneumatically connected to the diaphragm of the at least one fluid ejector.

Regarding the use of the word "pneumatic" it shall be noted, that instead of air as a pressure agent any kind of a gas or even a hydraulic liquid could be used. The name "micropneumatic" in this invention should not be seen as limitation to the use of air as pressure agent.

The fluid ejector according to the invention is the part of the printhead 1, which generates a fluid discharge based on the drop-on-demand principle. It comprises at least one fluid inlet and at least one fluid outlet. A pneumatically controlled fluid ejector is a fluid ejector, which is operated by a diaphragm with the aid of pneumatic energy, here by means of the control pressure $p_c$.

A printhead according to the invention can work according to a fluid displacement principle, i.e. the ejectors 4 are sort of control pressure $p_c$-actuated fluid-displacement-means. According to the displacement principle, the mechanical deformation or movement of a diaphragm is transferred to the fluid in a cavity by reducing the volume of the fluid-filled cavity resulting in a fluid discharge through the fluid outlet 6. A printhead according to the invention further can work according to the valve principle, i.e. the ejectors are working according to the valve principle and diaphragms 8 act as valve diaphragm.

Figure 3:
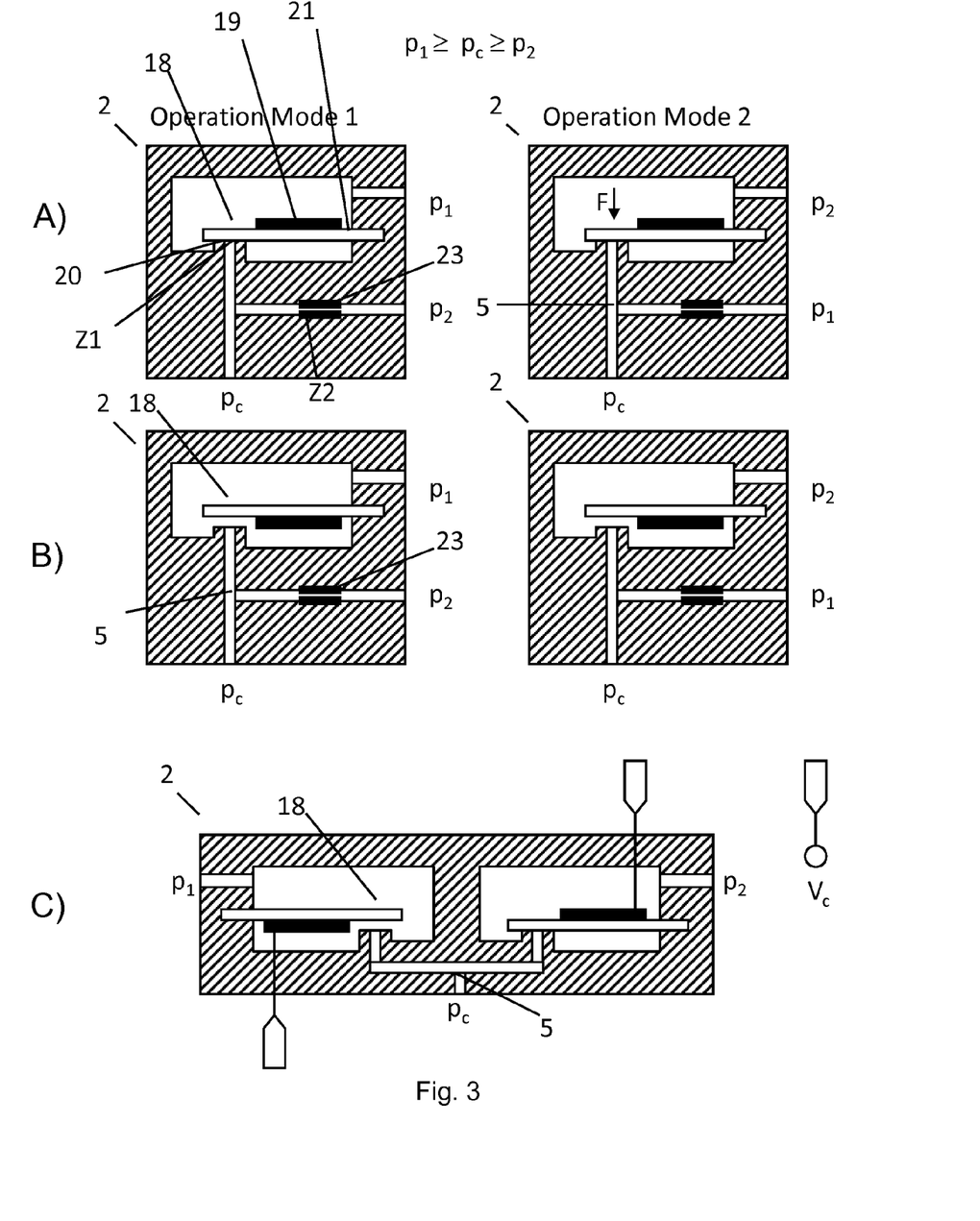
FIG. 3 shows embodiments of a micro-pneumatic-circuit according to the invention.

In FIG. 3 embodiments of micro-electro-pneumatic circuits are outlined for a single channel. Each comprise the pneumatic control pressure port at the bottom providing the control pressure $p_c$, which is used to actuate the fluid ejectors.

The micro-electro-pneumatic circuit contains between two pressure levels $p_1$ and $p_2$ a series circuit of a pneumatic element $Z_1$ and a pneumatic element $Z_2$, at whose common pneumatic node 5 a transient control pressure $p_c$ comprising at least two states is generated in a cavity to operate the fluid ejectors. Pressure sources can be designed virtually as pumps, compressors or vacuum pumps (Pabs<1 bar). Also in the context of the invention, an opening to the environment is to be interpreted as a pressure source with ambient pressure $(p=p_u)$.

According to the invention at least one of the two pneumatic elements $Z_1$ or $Z_2$ contains an electro-pneumatic transducer such as an electrically controlled pneumatic valve. This can function according to any transducer-principle, e.g. piezoelectric, electromagnetic, electropneumatic, electrostatic or electrostrictive and has a short response time T<<1 ms and a small dead volume. Preferably suitable are valves functioning according to the piezoelectric principle, which due to the electro-pneumatic amplification of the micro-electro-pneumatic circuit can be of extra small size. So in the following always the term 'micro-valve' 18 is used.

According to the invention at least one of the pneumatic elements $Z_1$ or $Z_2$ contains a micro valve $V_1$ and the other element is either a micro pneumatic valve $V_2$ or a pneumatic throttle 23. In the latter case, the micro-valve $V_1$ is the only valve per channel. Pneumatic throttles are characterized by their dissipative effect and have a linear or nonlinear flow resistance, which generates a pressure drop in the case of a fluid flow. Examples for a pneumatic throttle are a capillary 23, an aperture, a fluid redirection or a cross section change. It shall be noted in addition, that a pneumatic element $Z_1$ or $Z_2$ may not be only a single pneumatic throttle or micro-valve 18, but may also contain combinations of these, even a further pneumatic circuit.

According to the invention the ejector 4 is connected pneumatically to node 5 between $Z_1$ and $Z_2$, at which, depending on the valve position of the micro valve 18, the control pressure $p_c$ sets as required to control the fluid ejector. Pneumatic node 5 includes ducts and cavities extending to the active areas of the pneumatic elements $Z_1$ and $Z_2$ and to the pneumatic side of the fluid ejector, and therefore has a volume $V_K$. A volume $V_E$, the displacement volume of the ejector, has further to be added to this. Due to the compressibility of air the volume $V_K+V_E$ is a pneumatic compliance. This limits the speed of a change of state of the control pressure. To dimension the volumes $V_K+V_E$ the time constants of a switching operation can be calculated, with respect to the configuration of the micro-pneumatic circuit and the fluid ejector (see below), approximately to $$T_1 = R^* p_0 / (V_K + V_E)  \quad (1)$$

where R, depending on the considered switching operation equals to either the fluid resistance of an open micro-valve 18 in $Z_1$ or $Z_2$ or equals the flow resistance of the pneumatic throttle 23. To enable a clean fluid tear-off at ejector 4, the pressure change of the control pressure should be highly dynamic. According to the invention the circuit elements of a micro-electro-pneumatic circuit are dimensioned in a way, that the time constants for a state change of the pneumatic control signal $P_c$ is preferably in the range of 1 microsecond to 1 ms, especially preferably in the range between 1 microsecond and 100 microseconds. The demands for a high operating frequency, low weight and small size require the use of micro-valves 18, which on the other side only comprise a valve travel of about 0.05 mm. As a consequence, the flow resistance of the open micro valve 18 is of relevant magnitude, so that according to equation (1) a sufficiently small time constant can be achieved only if a miniaturization of the volume $V_K$ and $V_E$ is made.

To obtain an effective actuation of the pneumatically actuated fluid ejector, a high difference between the resulting pressure levels of the control pressure, is aimed. It is further aimed to keep the air consumption through the opened micro-pneumatic valve 18 and the pneumatic throttle small.—Both aims suggest to choose the flow resistance of pneumatic throttle 23 $R_D$ significantly, e.g. 10-fold higher than the flow resistance of the open micro-valve $R_V$. This dimensioning however has the disadvantage, that the time constant according to equation (1) for the drop of the control pressure across the pneumatic throttle 23 after closing the micro valve 18 is getting high, which again is (depending on the configuration of the ejector, see below) adversely for a clean fluid discharge or fluid tear-off. According to equation (1) it remains only the reduction of the volume $V_K$ and $V_E$ to realize short response limes. According to the invention, the elements of the micro-pneumatic circuit are miniaturized components and/or structures, particularly in the case of a miniaturization of the volume $V_K$ and $V_E$. But miniaturization is limited by the fact, that the flow resistance of pneumatic ducts compared to those for example of a pneumatic throttle are no more negligible in the dimensioning phase. At this point a discrete approach, in which e.g. pneumatic throttles are treated as a discrete pneumatic elements $Z_2$ should be changed in favor of a continuous model. Therefore according to the invention the pneumatic elements $Z_1$ and $Z_2$ are not limited to discrete pneumatic components, but rather should be seen as part of a device having a pneumatic effect, such as a pneumatic throttle effect between a first point and a second point in the geometry, in the case of pneumatic element $Z_2$, between the point at which the control pressure is set and the point at which pressure $p_2$ is applied to.

As illustrated in the examples in FIG. 3, the electrically actuated micro valve 18 preferably is realized as piezoelectric valve with a piezoelectric bending transducer. The embodiments each include a piezoelectric bending transducer in monomorphic configuration, which, for example, is a laminate of a piezoelectric transducer in $d_{31}$-operation mode and a substrate made of a nom-piezoelectric material in an elongated shape, whereby the freely movable end, when charging the piezoelectric element with an electrical voltage, deflects in the direction perpendicular to the side of the substrate on which the piezoelectric element is located. A suitable monomorphic transducer has, for example, a total thickness of less than 0.5 mm, a free length of 5 to 10 mm at a width of well below one millimeter. The free end of the piezoelectric actuator covers the valve opening 9, around which the sealing surface is arranged, here called a valve seat. The configurations in FIG. 3, A and FIG. 3, B contain a first pneumatic impedance $Z_1$ in the form of the described monomorphic piezoelectric micro valve 18 and a second pneumatic impedance in the form of a capillary $Z_2$.

The following detailed considerations assume, that the micro-electro-pneumatic circuit is fed by two pressure sources with $p_1 > p_2$. Accordingly, the control pressure $p_c$ only can take values between $p_1$ and $p_2$. The piezoelectric micro-valve 18 is located within a cavity, which depending on the operation mode of the micro-electro-pneumatic circuit is fed by a pressure $p_1$ or $p_2$. The capillary 23 is on one side connected to the micro-valve 18 and the control pressure port and on the other side with the remaining pressure source $p_2$ or $p_1$.

FIG. 3, A shows the two modes of operation of a micro-electro-pneumatic actuator according to the invention, in which a piezoelectric valve is configured as normally closed, i.e. in the non-electrically actuated condition, the valve is closed. In operation mode 1 in FIG. 3, A the higher pressure P1 is applied to micro-valve 18. This is closed and generates the full pressure drop $p_1 - p_2$. So the control output equals $p_c = p_2$. When electrically actuated the valve opens and creates the pressure drop as described above across the capillary 23, hence $p_c = A^*(p_1 - p_2)$. So the micro-electro-pneumatic circuit has non inverting behavior, i.e. an electrical control voltage results in an increase of the control pressure. Operation mode 1 of FIG. 3, A is preferably used in connection with a fluid ejector 4 according to the fluid displacement principle.

In the operating mode 2 in FIG. 3, A the pressure sources are reversed and further the piezoelectric valve is preloaded in a way, that its free end is pressed onto the valve seat with force F and therefore only opens above a pressure pg defined thus. During electrical actuation of the valve micro-valve 18 acts together with the pressure pg against the preload force F to open the valve. So in the non-actuated state the control pressure equals $p_c=p_g$, in the actuated state the pressure drops near $p_2$. Thus the micro-electro-pneumatic circuit exhibits inverting behavior. Operation mode 2 in FIG. 3, A for example is preferably to be used in combination with a fluid ejector 4 working according to the valve principle because in the electrically non actuated state for example valve diaphragm 8 of the fluid valve is pressed against the fluid orifice by a pressure equaling $p_g-p_{Fl}$.

FIG. 3, B shows the two operating modes of a micro-electro-pneumatic actuator according to the invention, in which a piezoelectric valve is configured as normally open. By considering analogous considerations as in the cases in FIG. 3, A, we obtain the following result:

In operation mode 1 in FIG. 3, B the micro-electro-pneumatic circuit has inverting behavior, in operation mode 2 in FIG. 3, B the micro-electro-pneumatic circuit has non inverting behavior. Accordingly also the several possibilities of combinations with the different ejectors are resulting analogous.

The micro-electro-circuits as shown in FIGS. 3, A and 3, B are characterized by the fact, that in the open-state position of micro-valve 18 a stationary air consumption is resulting, which is predominantly determined by the flow resistance of the capillary 23. When suitably dimensioned, particularly by miniaturization of the capillary 23, a low air consumption can be adjusted (throttling). This however means that the corresponding time constant for pressure build-up or pressure drop of the pressure $p_c$ (depending on configuration) over the capillary 23 is large and that the leak tightness requirements of the micro valve 18 increase. The micro-electro-pneumatic circuits further have in common, that always the side of the micro-valve 18 is connected to node 5 (which connects $Z_1$ and $Z_2$ and where the control pressure $p_c$ sets), which contains the valve opening, or which, in other words, has the smaller dead volume.

In FIG. 3, C a micro-electro-pneumatic Circuit 2 is shown, which does not exhibit stationary air consumption, by comprising a second micro-valve 18 instead of the pneumatic throttle as $Z_2$. If both micro-valves 18 are configured similarly (normally open or normally-closed, not shown here), the micro-electro-pneumatic circuit is operated in the way, that these are driven inversely to each other. There are advantages in an operation mode using two micro-valves 18 instead of a single: First, the control pressure levels directly equal the pressure levels $p_1$ and $p_2$ with only little deviation. Second, the pneumatic switching times for both switching processes are minimal. Higher manufacturing costs and a space requirement is the disadvantage. In FIG. 3, C one valve is configured as a normally-open valve and one as normally-closed valve. By this it can be avoided, that one piezoelectric valve has to be maintained permanently in the actuated i.e. stressed state.

Figure 4:
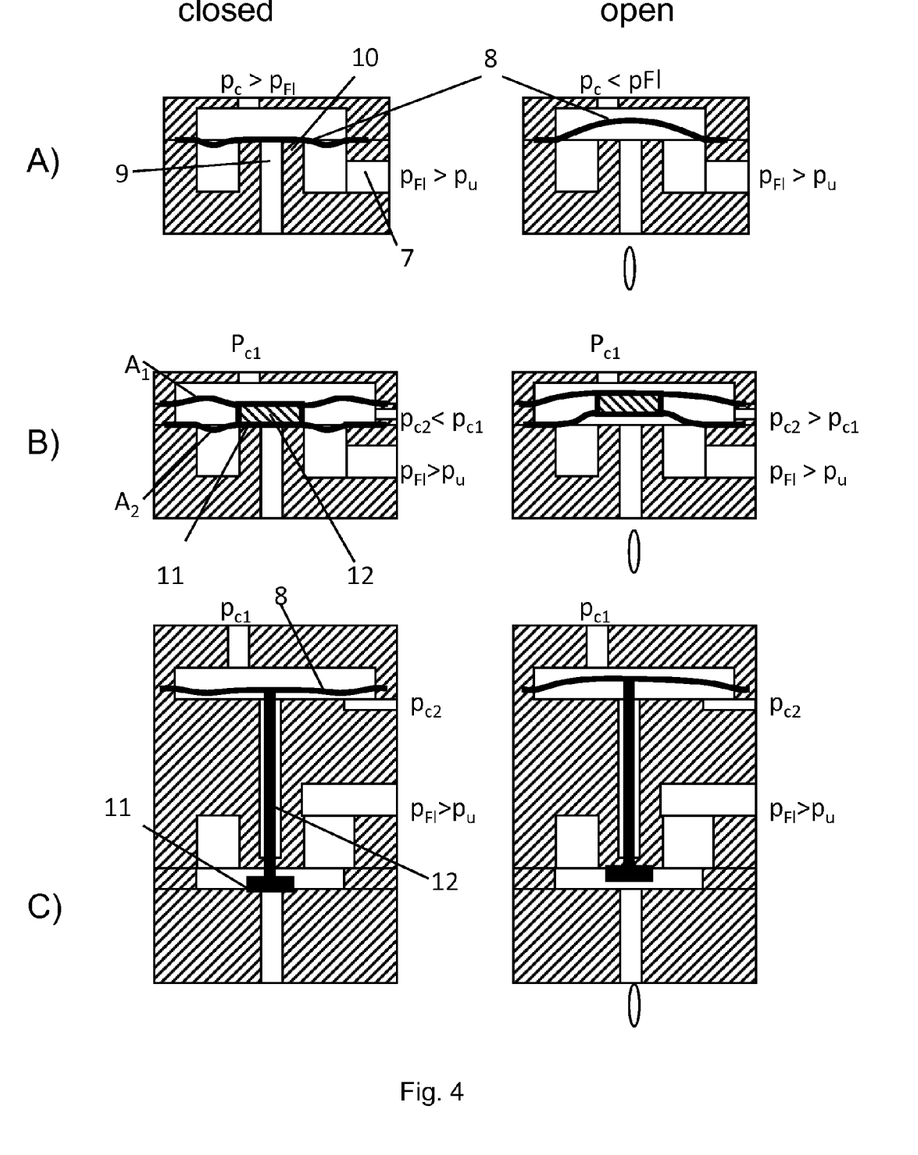
FIG. 4 shows embodiments of the invention of an ejector operating according to a valve principle.

In FIG. 4 embodiments of a fluid ejector 4 are shown working according to the valve principle. It should be noted that the invention is not limited to the illustrated embodiments, which only constitute examples of possible embodiments, because it is inessential in the present invention which nature the ejector 4 and in particular the operating element of the ejector is of, as long as its throughout structural design exhibits the required pneumatic controlled valve effect with sufficient small response time and sufficiently high fluid throughput.

The valve principle is basically a continuous working principle, which can be adopted to produce stationary fluid jets. A drop on demand printing operation is achieved by using very short valve-open times (in the order of microseconds to milliseconds), while variable dispense volumes are achieved by using variable valve-open times.

FIG. 4, A shows a diaphragm valve as an embodiment of a fluid ejector 4. An actuation element in the form of a diaphragm 8, which is pressurized on one side by the control pressure $p_c$, gets into contact with a sealing surface 10, when the control pressure $p_c$ exceeds the fluid pressure $p_{Fl}$, thus a valve opening 9 is closed, which is connected to the fluid outlet 6 (FIG. 4, A, left). Opposite, if the control pressure $p_c$ is smaller than the fluid pressure, the fluid pressure lifts the diaphragm 8 from the sealing surface 10 and fluid flows through the valve opening 9 and discharges from ejector 4. A diaphragm valve offers a high leak tightness due to the flexibility of the diaphragm, high speed operation due to the very small mass of the diaphragm and the advantage of easy fabrication. Within this invention the use of the term "diaphragm" shall not be limited to the narrow definition as used in the science of the strength of materials, whereupon a diaphragm only is able to transfer tensile forces. Instead, within this document the term shall also be extended to the case of the "plate", which is able to transmit bending moments, which means, that a diaphragm can be made of a more solid material or can have thicknesses, which usually fit into the definition of a "plate". Regarding the material of the diaphragm there also shall be no restrictions within this invention, suitable materials are for example, metals, thin glass, silicon, SiN, thermoplastics (such as PTFE, E/TFE, PFA, PVC, ABS, SAN, PP, PA, POM, PPO, PSU, PEBA, PEEK, PEI, Designations according to ISO 1043. 1), thermoplastic elastomers (TPE), elastomers (such as NBR, HNBR, CR, XNBR, ACM, AEM, MO, VMQ, PVMQ, PMQ, FVMQ, FKM, FFKM, AU, EU, ECO, CSM, NR, IR, BR, SBR, EPDM, EPM, IIR, CIIR, BIIR, TPE, description according to ISO 1629), polyimides, rubber and vulcanisate, natural-/synthetical rubber, thermosets (such as UP, PF, UF, UP-GF, description according to ISO 1043. 1), all polymers, including filled or fiber-reinforced polymers.

In a variant of the printhead according to the invention, the ejectors 4 are double diaphragm valves, actuated by the control pressure $p_c$. FIG. 4, B shows a double-diaphragm valve as a further embodiment of a fluid ejector 4. Instead of using a single diaphragm 8 as shown in FIG. 4, A, which combines the functions of valve actuation and sealing, these functions are realized here separately. A first diaphragm 8 with an area $A_1$ is subjected to a static pressure, which is transmitted via a coupling element 12 onto a sealing element, which seals the valve. The fluid contacts a second diaphragm 8, having an area $A_2$ and being connected to a coupling element and a sealing element 11. The coupling element may be realized lose as an insert, for example as an inserted sphere or cylinder, or may be realized as a compound together with the first diaphragm 8 and/or the second diaphragm 8. As well first diaphragm, coupling element, second diaphragm 8 and sealing element can be a single coherent structure, for example made of an elastomer material. With $A_2<A_1$ sufficient axial force and surface pressure for sealing the valve opening can already be achieved with control pressures $p_{c1}<p_{Fl}$. The double-diaphragm valve, as depicted as an example, has two ports for control-pressures, which can be fed in different combinations, whereupon it makes sense, however, to keep one of the two control pressures $p_{c1}$ and $p_{c2}$ constant and actuate the other by means of the micro-electro-pneumatic circuit.

For example, $p_{c1}$ is fed by a static pressure $p_{st}=p_{Fl}$, while the control pressure of the micro-electro-pneumatic circuit is connected to $p_{c2}$. When $p_{c2}$ increases, the fluid valve opens as a result of the effective fluid pressure $p_{Fl}$ even before the pressure $p_{c2}$ reaches the pressure level $p_{Fl}$ of the fluid. Opposite, $P_{c1}$ also can be fed with the control pressure provided by the micro-pneumatic circuit, while $p_{c2}$ is held constant at atmospheric pressure, for example.

FIG. 4, C shows a single diaphragm valve comprising a mechanical coupling and sealing device as another embodiment of a diaphragm-actuated fluid ejector 4. A rod 12, sealed by a radial sealing, transfers the motion of the diaphragm to a valve seal 11. Actuation is done using the ports $p_{c1}$ and $p_{c2}$ by applying a suitable combination out of a static pressure and a control pressure.

Further embodiments of a pneumatically actuated fluid valve, that are not presented here, can consist of all kinds and forms of mechanical actuation elements, seal elements or translation mechanics such as tipping- and leveraging elements, pneumatically deformable bellows, tubes or balloons or pneumatically actuated pistons to achieve a closing and opening effect of the valve opening 9.

Figure 5:
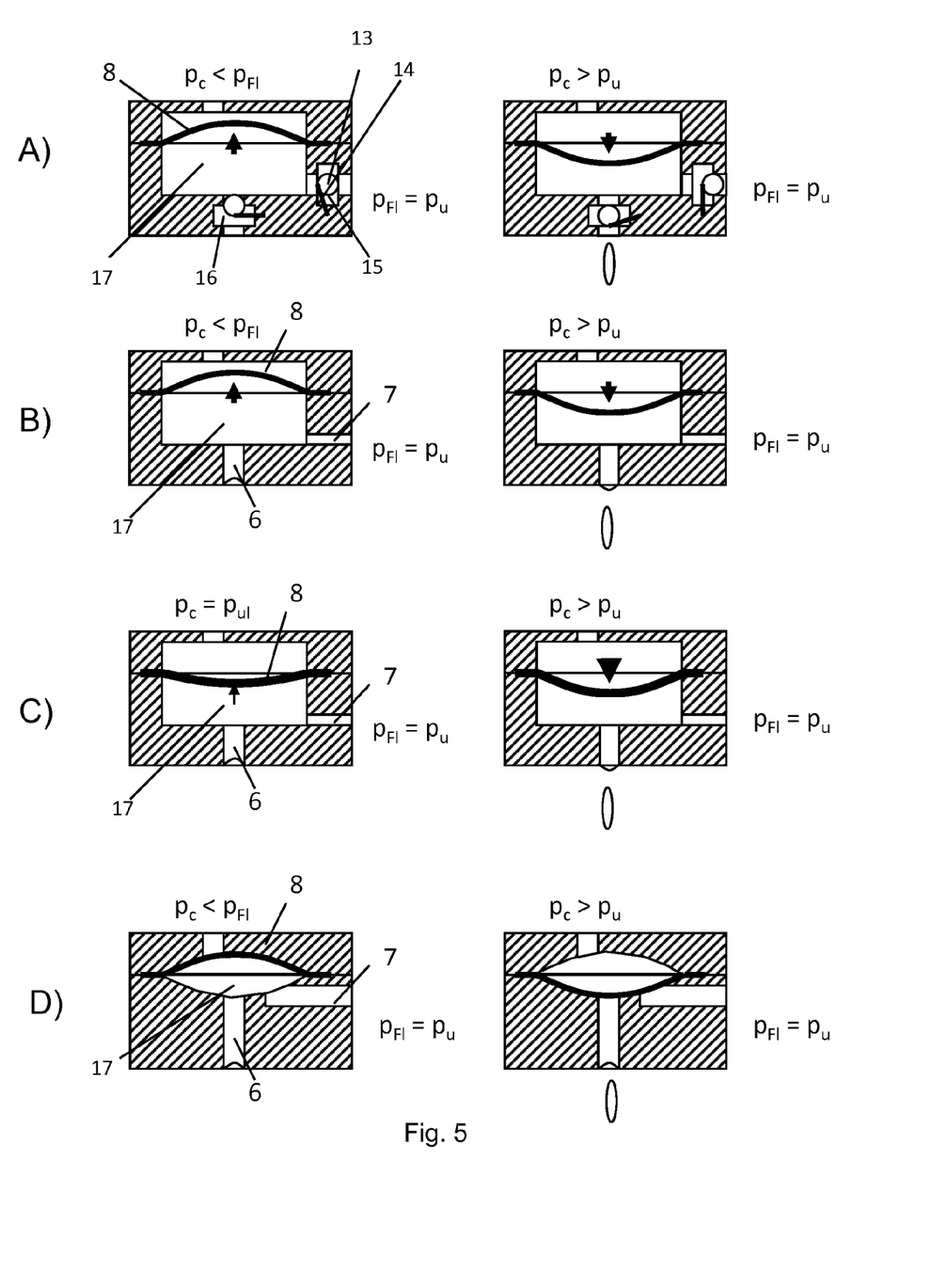
FIG. 5 shows embodiments according to the invention operating as a fluid displacement ejector.

To explain the devices and methods according to the invention in FIG. 5 there are different exemplary embodiments of pneumatically actuated fluid ejectors illustrated, which work according to the fluid displacement principle. These are preferably used in free-jet-dispensing-applications. The embodiments are each illustrated for the states of suction and ejection, which are the characterizing states of the fluid displacement principle.

FIG. 5, A illustrates the basic working principle of a pneumatically actuated fluid displacer for generating a fluid ejection. Fluid shall be available at the fluid inlet 7 with a pressure $p_{Fl}$, which is in the magnitude of the ambient pressure $p_u$. During suction phase, the control pressure $p_c$ is lower than the pressure of the fluid pfl. In the case of an ideal flexible diaphragm 8 the control pressure is transferred lossless to the fluid located in the ejector-cavity 17, so that the ball valve 13 for example, whose ball is held in position by a valve spring 14, opens to let the fluid enter the ejector-cavity. By switching the control pressure to $p_c > p_{Fl}$, the inlet valve 15 changes into the closed state, while the fluid outlet valve opens and fluid is expelled. To obtain a clean fluid output and a clean fluid tear-off a fast flap of the control pressure between its two states is necessary, which according to the invention is achieved by use of a micro-electro-pneumatic circuit.

Fluid discharge (FIG. 5, B) is done according to the invention by a highly transient pressure pulse of control pressure $p_c$. This transmits through the diaphragm 8 to pressurize the fluid in the ejector cavity 17. The fluid pressure then releases through an ejection of fluid through the fluid outlet 6 and through a return flow of fluid into the fluid supply 7. The pressure pulse of the control pressure is followed by a rapid drop of the control pressure to its lower pressure level, which in the best case is below the fluid pressure pFl (embodiment in FIG. 5, B). With the drop of the pressure inside ejector cavity below $p_{Fl}$ fluid is delivered through the inlet opening into the ejector cavity 17. The underpressure inside ejector cavity 17 simultaneously acts on the fluid outlet. Only the capillary forces of the fluid meniscus in the orifice of the fluid outlet 6 allow the buildup of a vacuum inside the ejector cavity and prevent that air is sucked in through the fluid outlet during this phase. Capillary forces in tubes are the larger, the smaller the diameter is. They decrease with larger diameter quadratically, so that the ink-jet principle is used only in high-resolution digital printing and in niches where for printing of low viscous fluids smallest fluid outlets 6 (nozzle) are used.

In FIG. 4, C as an example the case is illustrated, that a stiffer diaphragm 8 is used having higher restoring force than the one in the case of FIG. 5, B. In this case, the restoring force of the diaphragm 8 is predominantly used to suck the fluid in the ejector cavity 17 during the suction phase. The lower control pressure level therefore does not need to be an underpressure, as in the example of FIG. 5 B.

Ejectors according to the invention working according to the fluid displacement principle can be actuated advantageously by a configuration of the micro-electro-pneumatic circuit as in FIG. 3, A, operation mode 1. Using this configuration, due to the fast opening of the normally-closed piezo-electric valve, as a result of the electrical control signal, fast control pressure changes in the microsecond range can be realized, which favors a fluid discharge. During the suction phase a slow pressure drop inside the ejector cavity 17 is desirable to ensure that the pressure does not fall below the capillary pressure in the fluid outlet and, as a consequence, air is sucked through the fluid outlet 6 into the ejector cavity instead of fluid through the fluid supply 7. A slow drop of the pressure in the ejector cavity is achieved by designing the micro-electro-pneumatic circuit such that the time constant for the decrease of control pressure is higher than the time constant for the increase of the control pressure. This can be achieved in the design of the micro-electro-pneumatic circuit as in FIG. 3, operation mode 1 by designing the capillary 23 by choosing $R_K > R_V$.

In FIG. 5, D two further advantageous developments of FIG. 5, B are outlined, which can also be realized individually. First, the diaphragm 8 has two positive-fitting stops, so that the expelled fluid volume of the ejector cavity is exactly defined by the geometry. Second the diaphragm 8 when getting into contact with the lower surface closes the fluid outlet 8 and thus enforces an abrupt tear off of the fluid at the fluid outlet.

Figure 6:
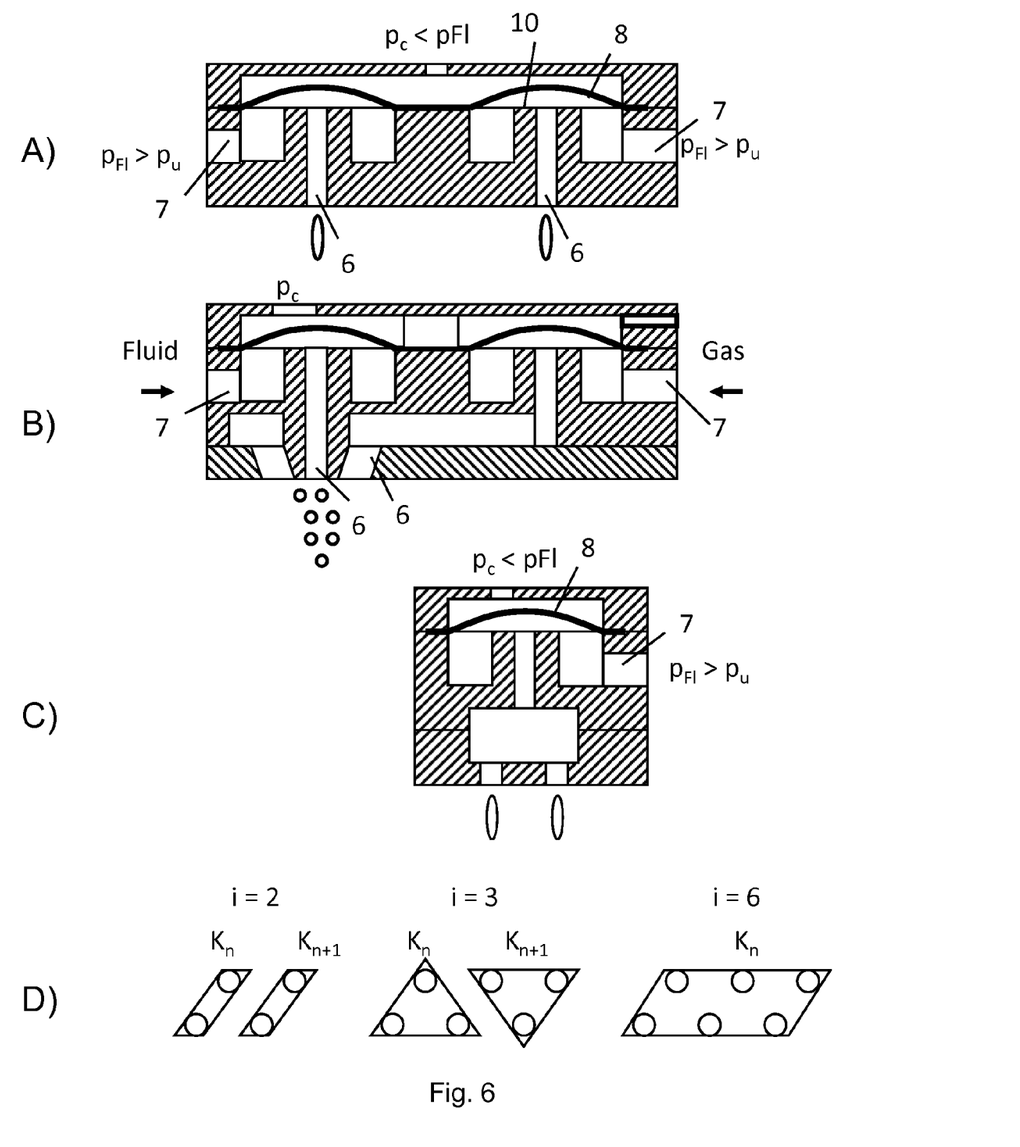
FIG. 6 shows embodiments of an ejector according to the invention operating according to a valve principle.

As outlined in FIG. 6, more than one ejector 4 may be principally actuated by the control pressure $p_c$ of a single channel, therefore, each channel may contain more than one ejector 4 (FIG. 6, A). In the case of two ejectors the two ejectors may both handle the same fluid or different fluids or a fluid and a gas, discharging them separately or internally mixed or externally mixed.

Also, several electrically independent controllable channels may each control one ejector and the outputs of these could be merged suitable for the production of a mixture.

A printhead according to the invention for example may contain a first ejector controlling a fluid, a second ejector controlling atomization air, said ejectors being actuated jointly by a control pressure of a single channel or being actuated by control pressures of two channels separately, and the fluid outlets of the first and second ejector being merged such that the fluid is atomized by the air. The fluid outlets can be merged within the printhead (not shown here) or in the way, that an atomization of the fluid is performed outside the printhead, as outlined in FIG. 6, B as an embodiment. The control pressure of a single channel is fed into a cavity above the diaphragm layer, as seen left on the example in FIG. 6, B. In electrically actuated state (low $p_c$), the fluid valve and atomization air valve are opened, so that atomization air and fluid are discharged through their respective fluid outlets. The fluid outlet 6 for the atomization air may be for example arranged as a ring nozzle 6 concentric around the fluid outlet 6, resulting in an fluid atomization outside the printhead. In the simplest case, an atomization can also be achieved by crossing jets of fluid and air outside the printhead. In principle, fluid atomization requires ducts for atomizing air, which are designed in the way, that an internal or external atomization of the fluid is possible by the atomizing air. In a simple variant atomization air is controlled externally, continuously or intermittently.

When using only a single channel by specifically selecting the entry point for the control pressure $p_c$, and by taking advantage of time delays a time shifted, especially in overlapping time control can be achieved, as outlined in FIG. 6, B. When using a micro-electro-pneumatic circuit according to FIG. 3, B, operation mode 1, this configuration effects the atomization air to always flow briefly before and after fluid discharge, therefore, a fluid ejection without atomization is avoided.

A fluid ejector further can still have more than one fluid outlet (FIGS. 6, C and D). This means, that there is more than one nozzle (fluid outlet 6) dedicated to each digital addressable channel, with the result, that a more uniform fluid distribution or layer thickness of a surface can be achieved or a further tasks can be performed. For example, several fluid outlets 6 may be arranged next to next or behind each other, in staggered rows, diagonally or any random, regular array. Advantageous are arrangements of at least two staggered rows of fluid outlets 6. As outlined in FIG. 6, D, a number of i, i>1 fluid outlets 6 are assigned to one digitally addressable channel n.

Figure 7:
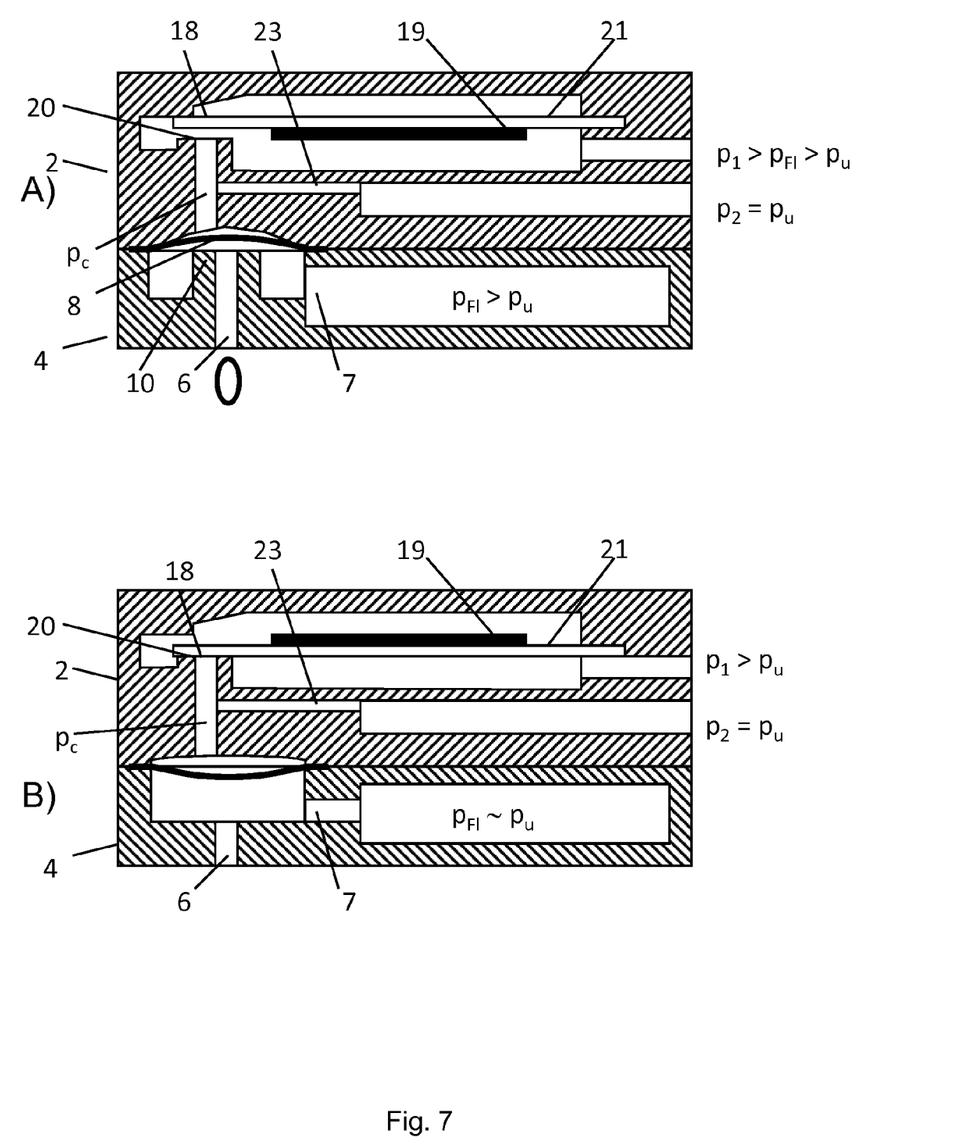
FIG. 7 shows preferred embodiments of a printhead 1 according to the invention.

FIG. 7, A shows a preferred embodiment of a printhead, where the micro-valve 18 is configured normally-open and is connected to the higher of the two pressure levels p1 and p2, and where the fluid ejector is a pneumatically actuated diaphragm valve. The embodiment is a combination of a micro-electro-pneumatic circuit 2 as in FIG. 3, B operation mode 1 and a fluid ejector 4 according to FIG. 4, A. In an advantageous dimensioning pressure level $p_1$, for example is set to 2 to 5 bar, pressure level $p_2$ at the second port of pneumatic throttle 23 is set to ambient pressure and the pressure level of the fluid is maintained at $0.8 \times p_1$. The mentioned configuration and pressure settings ensure, that the fluid pressure is always lower than p1, whereby even in the case of diaphragm leakage no fluid can penetrate the electrically sensitive area of the pneumatic valve chamber.

In this embodiment the devices and methods according to the invention allow by using the inventive micro-electro-pneumatic circuit 2 an amplification of the valve stroke of a piezoelectric valve of about 0.05 mm to a diaphragm valve stroke in the fluid ejector 4 of 0.2 mm to 0.5 mm, if using for example an elastomer diaphragm 8 with a thickness of 0.05 mm. By using the elastomer diaphragm, also highly particle loaded fluids can be processed, with particle sizes in the range of tenths of millimeters. On the one hand the deflection of the elastomer diaphragm of several tenths of millimeters allows the passage of particles in the open state, on the other hand, the high flexibility of the diaphragm in the closed state of the valve also allows an effective seal because particles are trapped by the elastic diaphragm. Due to the high elasticity of an elastomer diaphragm, contact of the diaphragm with abrasive particles only yields low internal stresses, which cannot damage the diaphragm. The diaphragm "gives way", so that elastomer diaphragms are preferable over other diaphragms in particular in the presence of abrasive particles.

With the configuration as described the time to open the valve is between 0.05 ms and 0.2 ms and the time to close the fluid valve <0.05 ms. These short transition times are only achievable by a miniaturized version of the micro-electro-pneumatic circuit and ensure a clean fluid ejection also of higher-viscous and/or particle-filled fluids with discharge frequencies in the kHz range.

FIG. 7, B shows an embodiment of a printhead, which is specifically suitable for the free jet printing of fluids. The printhead contains a micro-valve 18, configured as a normally-closed micro-valve and which is connected to the higher of the two pressure levels p1 or p2. The fluid ejector 4 is of the diaphragm fluid displacement type. The embodiment combines a micro-electro-pneumatic circuit 2 as in FIG. 3, A in operation mode 1 with a fluid ejector shown in FIG. 5, C, equipped with a stiffer diaphragm 8, for example out of PEEK in a thickness of 0.1 mm. The printhead may be operated with the same dimensioning of the elements of the micro-electro-pneumatic circuit as used in FIG. 7, A. Since the pneumatic resistance of the pneumatic throttle 23 is high compared to that of the open micro-valve 18, the time constant of the pressure release of the control pressure after fluid ejection is high too, which means, that the control pressure always decreases slowly. This behavior is desirable for fluid suction phase. On the other Hand, the flow resistance of the opened micro-valve 18 and the volume of the pneumatic node 5 are small, resulting in an efficient fluid ejection due to a fast pressure burst after the electrical actuation of micro-valve 18.

As a disadvantage of this configuration, due to an increasing diameter of the fluid outlets and thus decreasing capillary forces at the fluid outlets, longer filling times and thus lower operating frequencies must be taken into account to prevent the suction of air into the ejector cavity.

Figure 8:
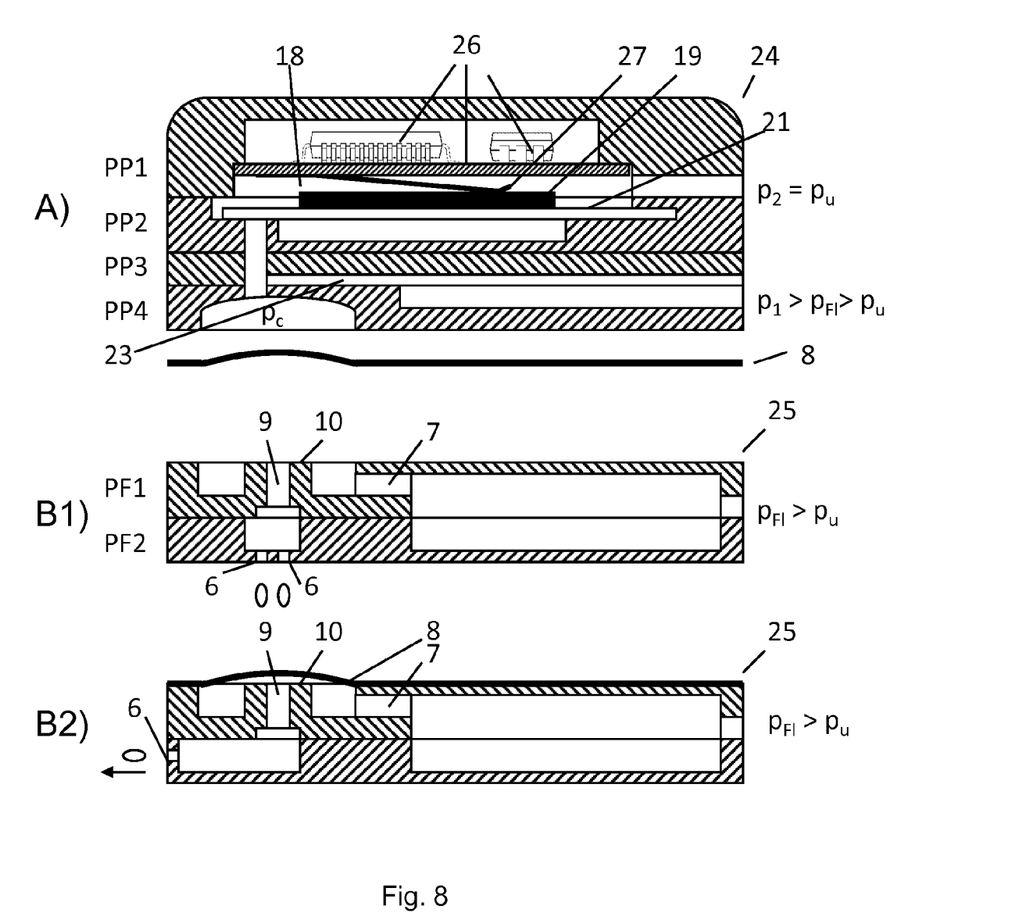
FIG. 8 shows preferred embodiments of a printhead composed out of patterned plates, each of which contain similar structures of the channels of the printhead.

FIG. 8 shows in a sectional view through a dosing channel an embodiment of a printhead design made of several patterned plates. It is based on a configuration as shown in FIG. 3, B and FIG. 4, A. Tens or hundreds of similar channels are arranged in a row perpendicular to the sketch plane.

According to the invention, the patterned plates may be manufactured separately out of metal, organic or inorganic materials. Thereby it is advantageous to design the mechanical structure such that functionally similar elements of several or all channels are each part of a common structure. Thus for example the valve seats and valve openings of the pneumatic micro-valves 18 of some or of all channels of the printhead 1 are contained in a patterned plate PP2, see FIG. 8 and/or the capillaries and/or pneumatic throttles 2 of the micro-electro-pneumatic circuit of several or all channels of the printhead 1 are contained in a patterned plate PP3, and/or parts of the monomorphic piezoelectric actuators 21 of the micro-valves 18 of several or all channels of the printhead 1 are contained in a patterned plate, and/or valve seats and/or similar parts of the fluid supply of several or all channels of the printhead are contained in a common patterned plate PF1 and/or the fluid outlets and/or fluid outlets of several or all channels of the printhead are contained in a patterned plate PF2. Diaphragms of several or all channels may be part of an integrated diaphragm part, too.

Due to the high requirements of dimension accuracy of the elements of the micro-pneumatic circuit, such as capillaries or valve openings of the micro-valve, as well as for the elements of the fluid ejectors, such as the fluid outlets, valve seats and valve openings, the invention proposes, that at least one of the patterned plates is patterned using micromechanical techniques. Micro-mechanical techniques include all manufacturing techniques and processes, known from Microsystems technology (MEMS) and engineering of micro-structures. For example pneumatic capillaries, fluid channels, fluid outlets and valve seats may be realized on a one or double-sided micro patterned plate using a combination of a lithographical and an etching technology (subtractive process) or by adding layers, which also lithographically patterned (additive process). Furthermore, the micro mechanical techniques include the methods of the micro-injection molding or other duplication methods.

According to the invention, the patterned or micro patterned plates are bonded together using techniques such as gluing, welding, heat sealing or laminating.

As cheep manufacturing technology it is proposed to manufacture the printhead or parts of it using multi-layer technology. This is a technique, which is originally used for the production of multi-layer-printed-circuit-boards (PCB). Some of the layers used in electronics, such as bondplys, are replaced by etched thin metal plates (0.05 mm . . . 0.5 mm thickness), which are equivalent to, for example, the above-described patterned or micro-patterned plates. Thus, the bonding of the plates is done by laminating, like it is done in circuit board manufacturing by using previously cut preimpregnated adhesive-Sheets (sheet-adhesive, prepreg), for example based on epoxies or acrylates.

For operation, cleaning and service, it is advantageous, if certain groups of patterned plates are combined by bonding them to contiguous parts. According to the invention, for example, the patterned plates, containing elements of the micro-electro-pneumatic circuits of several, or all channels, are combined into a single unit. This will be referred to as pneumatic part 24. In the embodiment shown in FIG. 8 the pneumatic part consists of the plates PP1 and PP2, PP3 and PP4. The pneumatic part 24 advantageously includes components and structures, which are only subject to little or no wear and/or their production is costly.

According to the invention it is advantageous that fluid-carrying parts of the printhead are grouped together to a fluidic part 25, composed out of patterned plates, which in FIG. 8 are the plates PF1 and PF2, and optionally the diaphragm 8. The plates, components and structures of the fluidic part are subject to wear and pollution by the fluid. Therefore it makes sense to manufacture the fluidic part cheep and configure it interchangeable. According to the invention it is further advantageous, that the fluid-carrying parts of the printhead are combined to a fluidic part 25, which is interchangeable using a detachable connection. Due to the materials used and the structural design of the fluidic part it can be adapted within wide limits to the demands of a fluid or a printing or dispensing task. To print highly viscous, chemically aggressive fluids, for example, flourpolymer materials can be used. The diameter of the fluid outlets can be adapted to achieve the required droplet sizes. If abrasive fluids such as paints with pigments and fillers are to be printed, the invention proposes to design the fluidic part 25 as a disposable part, manufacturing, for example, the components of it using plastic injection molding and bond them together by laminating, gluing or by thermal joining processes, especially ultrasonic welding, laser welding, heat sealing or impulse welding.

BEST MODE FOR CARRYING OUT THE INVENTION

In FIG. 8 A a pneumatic part 24 is outlined, whose cover PP1 includes an electronic circuit board with control electronics 26 for driving the piezoelectric actuators of the microvalves of several or all channels. The contact of the piezoelectric elements is performed by spring contacts on the circuit board directly to the piezoelectric elements 19. The spring contacts additionally provide a force F to press the valve actuator onto the valve seat and thus keep micro valve 8 in a normally dosed position.

In FIG. 8, B1 an embodiment of a fluidic part 25 is shown, consisting of the plates PF1 and PF2 with one fluid ejector 4 for each channel, using the valve principle, having multiple fluid outlets 6 per ejector 4. The first fluid plate contains parts of the fluid supply structures 7, as well as the parts circular orifice, valve seat 10 and valve opening 9 of the respective fluid valve. The second fluid plate contains for each channel the complementary part of the fluid supply structures 7 as well as the fluid outlets at the bottom. Using the configuration as outlined having more than one fluid outlet 6 per ejector 4, a larger channel spacing and thus lower print resolution may be advantageous, if it is desirable to achieve a more even thickness distribution within one addressable pixel. The fluidic part 25 of FIG. 8, B1 is adjusted together with a separate, all channels spanning diaphragm layer 8 and the pneumatic part 24 by means of alignment pins (not shown) and then pressed together between the jaws of a clamping device.

FIG. 8, B2 shows a fluidic part 25 in side-shooter configuration. The diaphragm layer is welded fix to the fluidic part 25, so that fluid leakage and contamination while changing the part is avoided. Alternatively, diaphragm 8, or another diaphragm 8 may be fixed to the pneumatic part to avoid the penetration of dirt or liquid into the pneumatic part 24.

The invention proposes, that the fluidic part 25 is pressed against a patterned plate of the pneumatic part 24, containing the n control-pressure-ports, by means of a pressing device, so that the n control pressure-openings of the pneumatic part are pneumatically connected with the actuator diaphragms 8 of each corresponding ejectors. Pneumatic Part 24, Part 25, and fluid diaphragm 8 may be pressed together by a pressing device in the form of a screw fitting, a press fitting, by bracings or clamps. The commonly used diaphragm 8, by taking advantage of their elastic properties, is further used as a seal between fluid and pneumatic part 24 part 25, particularly as a surface seal.

According to the invention, a diaphragm layer may be connected to the fluidic part, for example by welding the diaphragm 8 to the fluidic part 25, see FIG. 8, C (example of a side-shooter), which contains the diaphragms of several channels. Thus the printhead comprises only a two-parts structure, which compared with a 3-parts structure offers the advantage of faster handling during change of the fluidic part and immanent leak tightness between fluidic part 25 and diaphragm 8. Equally, however, the diaphragm layer 8 or a second diaphragm layer can be securely attached with the pneumatic part.

According to the invention for example the pneumatic part 24 can be fixed into a printing or dosing apparatus by use of screw fitting. The printing or dosing apparatus then may comprise a clamp or quick-lock fitting, in which diaphragm 8 and fluidic part 25 can be inserted and, when exactly aligned, pressed against the bottom side of the pneumatic part 24.

Such a modular design offers maximum flexibility when changing to different fluids, when exchanging a differently configured, defective or worn diaphragm or when exchanging an otherwise configured, dirty or contaminated fluidic part 25.

Figure 9:
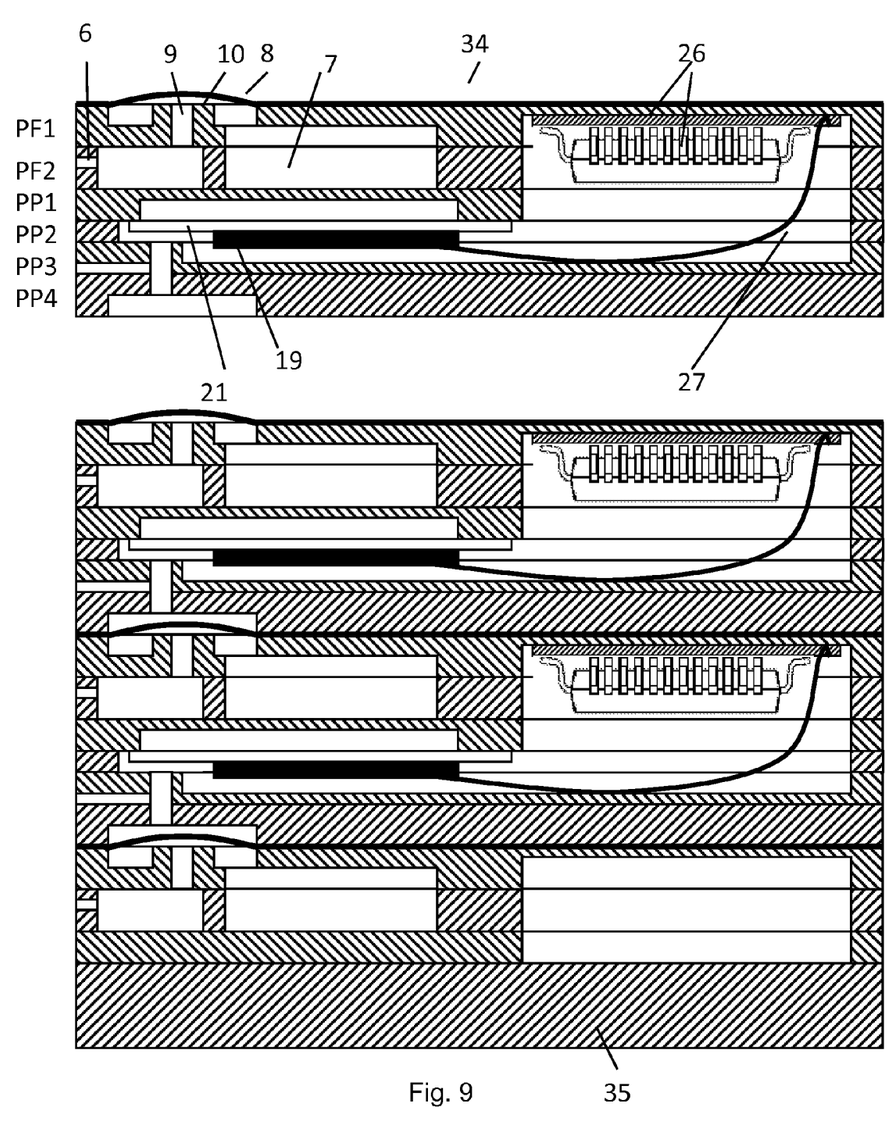
FIG. 9 shows preferred embodiments of a device according to the invention to prevent drying up of the fluid outlets.

Regarding multi-color printing (for example, 4-, 5-, 6-color), according to the invention a setup is proposed, in which a printhead contains a variety of flat modules 34 in an array configuration, which each are manufactured out of thin, patterned, parallel plates, which each contain the features of fluid ejectors and micro-electro-pneumatical circuits, see FIG. 9, whereby the micro-patterned plates are preferably metal plates patterned by using etching techniques. To bond the metal plates together it is proposed to use patterned sheet adhesive and a lamination process. A module 34 contains in a lateral arrangement the structures of the micro-electro-pneumatic circuits and of the fluid ejectors, being e.g. configured as side-shooter, of one or multiple colors. According to the invention the paint supply lines for the different colors and the pneumatic supply lines are fed perpendicular to the plates through the entire width of the printhead. To be able to easily replace individual modules, the module-stack is preferably pressed together in a detachable way between two edge-plates 35. As suggested in FIG. 9, each module can include a separate electronic control, in the case of a 4-color printhead 4-channel microchips are well suited. The fluid outlets of each color channel can be arranged in parallel and in some distance to each other, they also can internally lead together and to a common fluid outlet, thus performing an internal mixing. Finally, as in FIG. 6, B, the discharged paint can be additionally atomized. Atomization can be performed by means of continuous atomization air or discontinuously by means of an additional channel, which controls the atomizing air.

The invention claimed is:

1. Multichannel printhead, at least of channel of the printhead comprising: a micro-electro-pneumatic circuit 2 providing a control pressure $p_c$ at a pneumatic node 5, the micro-electro-pneumatic circuit 2 comprising a microvalve element V1 being connected to a first pressure level and to pneumatic node 5 and a microvalve element V2 or throttle 23 being connected to pneumatic node 5 and to a second pressure level, a drop-on-demand fluid discharging element discharging an amount of fluid through at least one fluid outlet 6, whereby actuation of the fluid discharging element 4 is controlled by the control pressure $p_c$.

2. Multichannel printhead according to claim 1, wherein the volume of the cavity as associated with pneumatic node 5 is configured sufficiently small, that the time constant of a state change of a control pressure $p_c$ is in the magnitude of a millisecond or below, in particular, wherein the cavity as associated with the pneumatic node 5 is configured as a micro-cavity.

3. Multichannel printhead according to claim 1, wherein the microvalve element V1 is actuated by a piezoelectric transducer 19, the piezoelectric transducer in particular being configured as a piezoelectric bending transducer.

4. Multichannel printhead according to claim 1, wherein multiple drop-on-demand fluid discharging elements 4 are within a fluidic part 25 and multiple micro-electro-pneumatic circuits 2 are within a pneumatic part 24, the parts 24 and 25 being joined by a detachable connection functional to transfer an energy associated with each channel's control pressure $p_c$ to the corresponding fluid discharging element 4.

5. Multichannel printhead according to claim 1, characterized in, that the fluid discharging element 4 includes an elastomeric diaphragm 8, which is actuated by an energy associated with the control pressure $p_c$, and which further interacts with a valve seat 10 to function as a fluid valve.

6. Multichannel printhead according to claim 1, characterized in, that a fluid with thixotropic behaviour, a particle loaded fluid, a dispersion paint, an emulsion, a varnish, a plaster, an adhesive, an UV-curable polymer or a thick paste is discharged through the fluid discharging element 4.

7. A method for printing of fluids by a multichannel printhead according to claim 1, comprising the steps of generating multiple control pressures $p_c$ at multiple pneumatic nodes 5 by multiple micro-electro-pneumatic circuits 2, each micro-electro-pneumatic circuit 2 comprising a microvalve element V1 being connected to a first pressure level and to the pneumatic node 5 and a microvalve element V2 or throttle 23 being connected to pneumatic node 5 and to a second pressure level, transferring energy supplied by the control pressures $p_c$ to multiple corresponding drop-on-demand fluid discharging elements 4 via miniaturized cavities, discharging an amount of fluid through the at least one fluid outlet 6 of the multiple fluid discharging elements 4 responsive to the corresponding control pressures $p_c$.

8. Multichannel printhead according to claim 1, whereby the microvalve elements V1 of multiple channels are part of a common structure.

9. Multichannel printhead according to claim 1, whereby the microvalve elements V2 of multiple channels are part of a common structure.

10. Multichannel printhead according to claim 1, whereby the throttles 23 of multiple channels are part of a common structure.

* * * * *